United States Patent Office

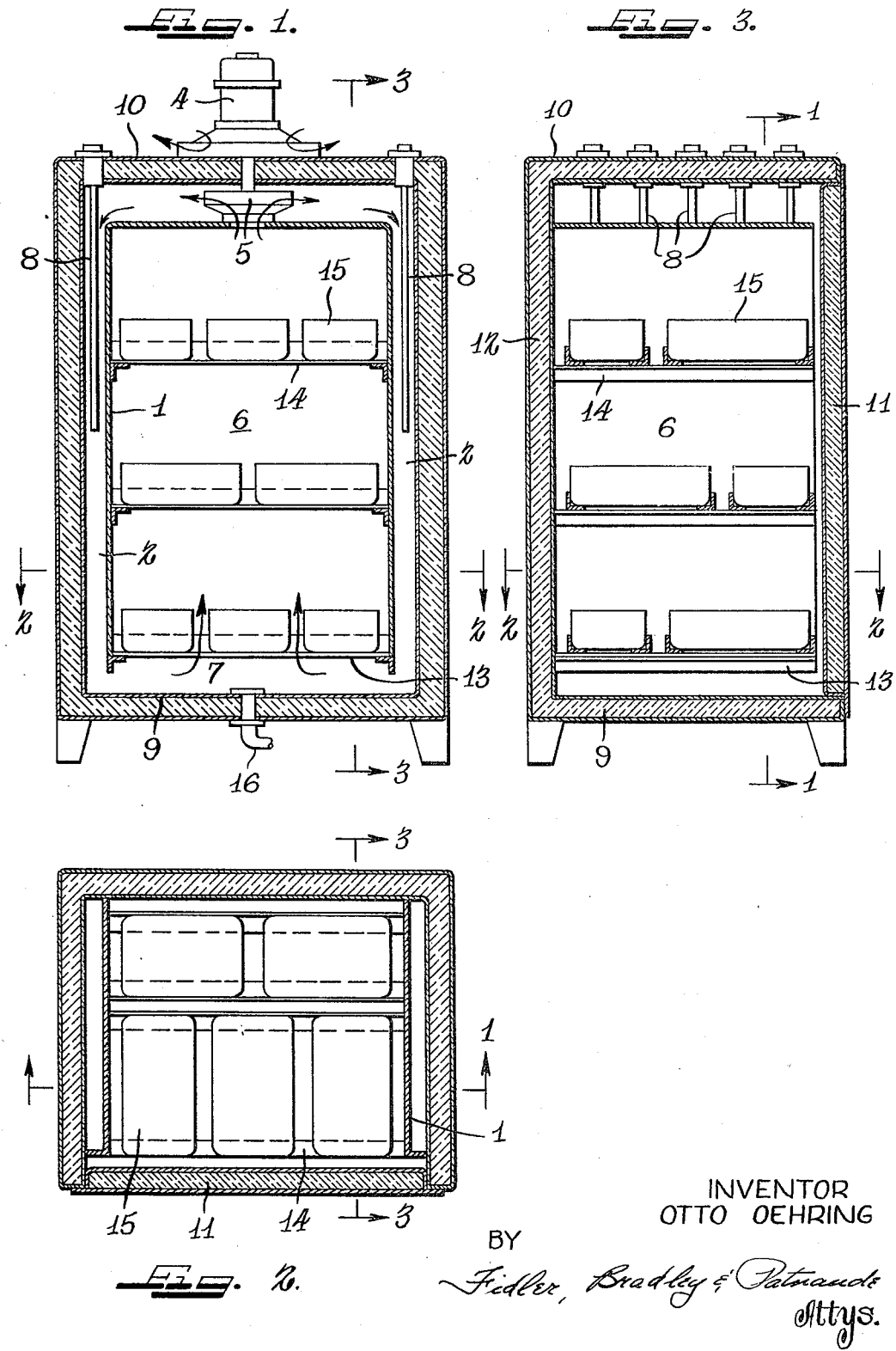

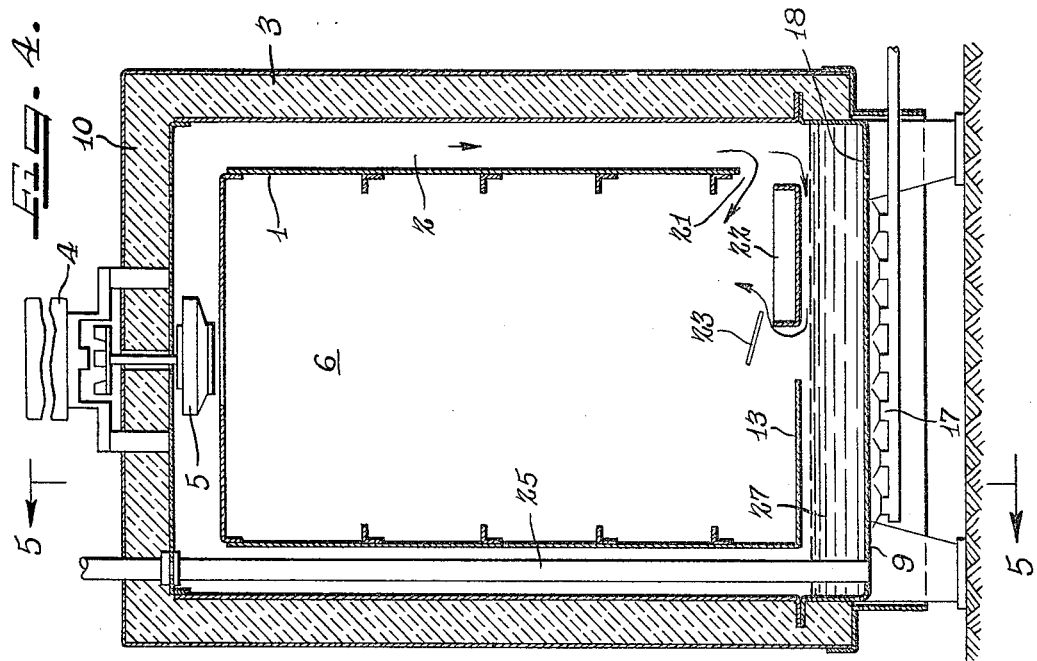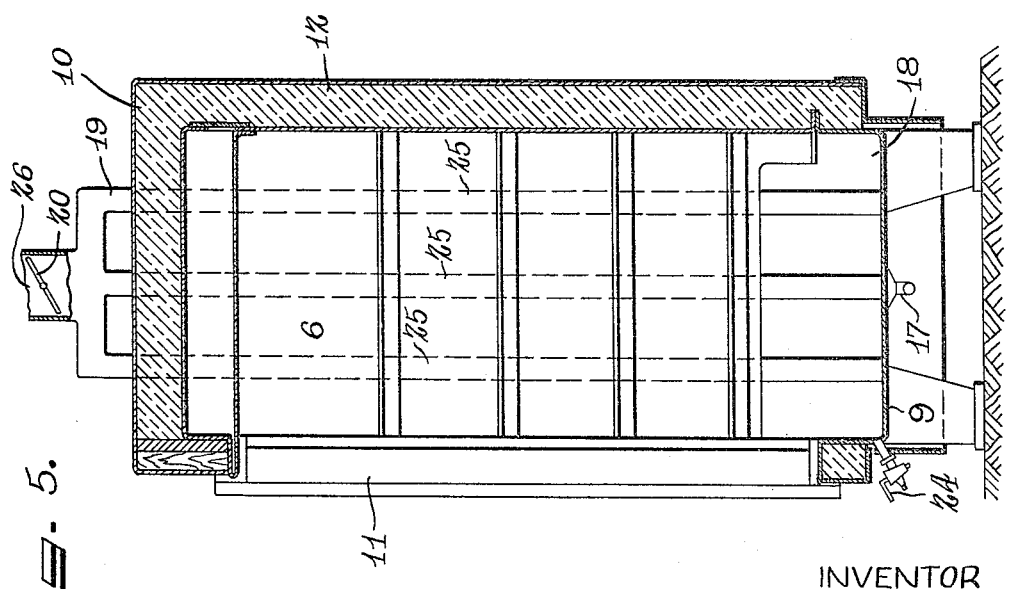

3,279,451
Patented Oct. 18, 1966

3,279,451
APPARATUS FOR HEAT TREATING MEAT PRODUCTS AND CARCASSES
Otto Oehring, 26 Siemensstrasse, Goslar, Harz, Germany
Filed Mar. 25, 1963, Ser. No. 267,758
6 Claims. (Cl. 126—21)

This is a continuation-in-part of my copending application Serial No. 373,998, filed August 13, 1953, and now abandoned.

This invention relates to an improved heat treatment apparatus and process used for cooking meat, for instance, ham, sausages, and other meats, as well as for scalding carcasses so as to facilitate dehairing.

Meat products, such as ham, are usually prepared and boiled in suitable molds in a water or steam bath. Boiling in a water bath, as is known, results in loss in weight and leaching of the goods. Not only the nutritional value of such boiled food products is considerably impaired but also their taste. Steam boiling in a closed receptacle has overcome, to a certain extent, said disadvantages, i.e. loss in weight and impairment of nutritional value and taste. However, steam boiling causes collection of large amounts of condensed steam within the steam boiler. The condensed water may even come into contact with food products treated in such steam boilers, if their covers are not tightly closed or become loose or leaky. Therefore, even in steam boilers, leaching of the goods cannot always be avoided especially when working on a large scale. Furthermore, steam boiling requires autoclaves which are rather expensive and must constantly be supervised and controlled, thus involving considerable expenses.

Other processes of preparing and cooking food products have also become known whereby boiling is effected by means of hot air circulated in the boiler at a low velocity. Such processes were used in preparing sausages and the like wares of satisfactory keeping quality which withstand treatment with hot air of only low velocity of circulation.

Cleaning of slaughtered animals, especially of hogs, is usually very difficult. For this purpose, for instance, slaughtered hogs are first subjected to a scalding treatment. At slaughterhouses, where steam is available to heat the scalding kettle, the scalding water is maintained at a constant temperature, usually at 140° F. to 144° F. The slaughtered hog is immersed into the kettle filled with scalding water of said temperature and is kept in motion while in the water until the outer skin is scalded and the hair grown therein can readily be removed by scraping the scalded skin. By said treatment, at the same time, scurf and dirt adhering to the skin are loosened and can also be readily removed by subsequent scraping.

In general and especially on days when a great number of hogs are slaughtered, it is unavoidable that several hogs are successively immersed into one and the same charge of scalding water. Since the animals are always dirty and since part of said dirt is loosened and passes into the scalding water, said scalding water becomes progressively dirtier. The scalding temperature is usually not high enough to ensure destruction of all the innumerable germs with which the scalding water becomes contaminated. Therefore, the scalded hog carcasses become not only externally but also internally more or less strongly infected. Internal infection of the carcass usually is effected by way of the slaughtering wound and the windpipe, bronchial tubes and the lungs. The value of infected parts of the carcass is, of course, considerably reduced and said parts must frequently be completely discarded as unfit for human consumption. Therefore, in many slaughterhouses so-called throat pieces of club-like form are inserted into the throat of the killed hog before scalding. The throat pieces serve to prevent entering of dirty scalding water into the carcass. However, these pieces often become loose during scalding. Therefore, even this precaution does not ensure that no infection of the inner parts of the carcass takes place on scalding.

Attempts have been made to avoid these difficulties by singeing the carcass over an open flame or by immersing the same into a hot solution of synthetic resin or of wax and by scalding the carcass in this manner. These processes, however, have found only limited application in slaughterhouse practice because a number of various technical disadvantages are involved therewith and, primarily, because the costs are very high.

Scalding in steam has also not proved successful because such steaming, on account of the varying temperatures with which the steam comes into contact with the animal body, is apt to cause extensive cooking of the skin and setting of the hair, thus rendering impossible proper removal of the hair scraping.

It is one object of this invention to provide a heat treatment or cooking apparatus and process which is especially suitable for preparing, cooking, and boiling meat products, such as ham and the like, whereby hot air circulating with a high velocity is used as heating agent.

Another object of the present invention is to provide a simple and effective process of scalding carcasses so as to soften the skin of the slaughtered animal and facilitate removal of hair without substantially affecting the meat of the animals.

A further object of the present invention is to provide a highly advantageous apparatus for carrying out such a heat treatment of meat products and of carcasses.

Other objects of this invention and advantageous features thereof will become apparent as the description proceeds.

In practicing the present invention, the meat products are heat treated, i.e. scalded or cooked in a closed chamber. The heat treatment chamber is in an entirely closed, heat insulated casing the inner temperature of which can be raised to the desired temperature by any known means, preferably by indirect steam heating or by electrical heating with thermostatic adjustment of the heating elements. Furthermore, according to the present invention, hot air is circulated through the heat treatment chamber and is saturated with steam. The rapidly circulating air is heated to a heat treating temperature of about 60° C. to 80° C., as determined by a hot air thermometer. Steam is taken up by the circulating air from a water container at the bottom of the cooking chamber and the water in the container is heated until a steam thermometer shows the same temperature as the hot air thermometer.

It is, of course, also possible to introduce steam into the circulating air from an outside steam source, whereby care is taken that the steam supply is just sufficient to saturate the rapidly circulating air with water vapors at the heat treatment temperature.

In the accompanying drawing which illustrates certain apparatus designed to effectuate the process of this invention and in which like reference characters indicate like parts, FIG. 1 is a vertical cross-sectional view of an apparatus suitable for a heat treatment according to the present invention, along the line I—I of FIGS. 2 and 3, FIG. 2 is a horizontal cross-sectional view of the apparatus along the line II—II of FIGS. 1 and 3, FIG. 3 is another vertical cross-sectional view of the apparatus along the line III—III of FIGS. 1 and 2, FIG. 4 is a vertical frontal cross-sectional view of another type of apparatus according to the present invention, and FIG. 5 is a vertical lateral cross-sectional view of the apparatus illustrated in FIG. 4 along the line V—V of said FIG. 4.

The drawings illustrate a simple and effective apparatus for cooking food. This apparatus comprises an upright heat-insulated and fluid impermeable outer casing 3 and, mounted in spaced relation to said outer casing 3, chamber or cabinet 1 adapted to receive the food to be treated. The walls of casing 3 and cabinet 1 define an air space or chamber 2 therebetween which surrounds the cabinet. Electric motor 4 is arranged in the casing on top 10 of the cabinet and fan 5 within the air chamber.

Motor 4 drives fan 5 of high circulation capacity adapted to cause air circulation within air space 2 and chamber or cabinet 1. Said fan is adapted to recirculate the moist hot air volume in the chamber between about 1000 times and about 3000 times and preferably 2000 times per hour. The direction of the air circulation is indicated by arrows and shows the air being forced in a closed cycle downwardly through the chamber 2, then upwardly through the fluid permeable bottom wall 13 into the cabinet 1 and back into chamber 2. Thus, air is forced in downward direction through air space 2 along heat insulated walls 3 of the apparatus towards heat insulated bottom into lowest part 7 of the apparatus. At the bottom 9 the air flow is reversed and the air is forced upwardly within chamber or cabinet 1 through its interior 6. Bottom 13 of chamber or cabinet 1 is fluid permeable and, thus, allows the circulating air to enter heat-treating space 6. Grates 14 or other devices for holding trays, molds, and the like receptacles 15 are provided in said chamber or cabinet 1.

Heating elements 8 are installed at the top 10 of the apparatus. They are arranged in such a manner that they heat air space 2. The heating elements 8 may be of the electric heating element type. They may also be steam pipes through which steam is passed. The temperature of heating elements 8 is controlled and adjusted by suitable thermoelectric couples, not shown in the drawings. Said thermoelectric couples automatically maintain the desired temperature within the apparatus. Since the general construction and the details in the operation of such thermoelectric couples and the means of actuating heating elements 8 by means of such thermoelectric couples are well known and familiar to those skilled in the art, these heat regulating and adjusting elements are omitted in the drawing as unnecessary and as interfering with a consideration of the invention proper. They will be readily supplied by those skilled in the art.

One wall of the apparatus is designed as door 11 through which receptacles 15 charged with food to be heat-treated can be introduced or the treated food can be removed. Inlet opening 16 is provided in bottom 9 of casing 3. Said inlet opening 16 serves for introducing steam under controlled conditions into chamber 1 in order to maintain the moisture content of the circulating air at the saturation point and for removing from time to time any excess humidity condensed in the apparatus.

In practicing the process according to the present invention the articles of food to be heat treated, for instance, hams, are placed into receptacles 15. Door 11 is then closed and the air space 2 is heated, for instance, to 80° C. and constantly kept at this temperature during the treatment. At the same time, steam of the same temperature is blown into chamber 1 through pipe 16 to saturate the air with moisture at said temperature.

FIGS. 4 and 5 illustrate another simple and effective apparatus which may be advantageously used in the process of this invention and especially for scalding hog carcasses. As in the embodiment of FIGS. 1 to 3, the chamber or cabinet 1 is separated by air chamber 2 from heat insulated and fluid impermeable outer casing wall 3. Electric motor 4 is provided on top of the apparatus to drive air circulating fan 5 which is arranged within the air space 2. Fan 5 causes the air to continuously circulate within chamber or cabinet 1, thereby conducting the air current withdrawn from the top of heat treating space 6 through air space 2 in downward direction along walls 3 of the device, toward its lowest part, bottom 9. Chamber or cabinet 1 has a fluid permeable bottom 13 through which the air enters heat treating space 6 and is forced in upward direction through said space 6. Bottom 9 carries or is designed to form water trough 18. At the bottom, the air flow is reversed and the air is forced upwardly within chamber or cabinet 1 through its interior 6. Bottom 13 of chamber or cabinet 1 is fluid permeable and, thus, allows the circulating air to enter heat treating chamber 6. Grates 14 or other devices for holding trays, molds, and the like receptacles 15 are provided in cabinet 1.

The trough 18 is filled with water to level 27, i.e. a small distance from bottom 13 of cabinet 1. As is evident, the air, before entering cabinet 1, passes along the surface of the water present in trough 18. The trough 18 and the water therein is heated by gas burner 17. The waste gases from said burner 17 are removed through flue pipe system 25. The flue pipes 25, on their way through the air space 2, transmit their heat to the walls of cabinet 1 and to chamber 6, thus functioning as a heat exchanger. Outside the apparatus, at top 10 thereof, the flue pipes 25 form collector or header 19 and pass through outlet 26 into the atmosphere or a chimney. The outlet pipe 26 can be more or less opened or closed by throttle valve 20 which is controlled and adjusted by thermal means. The throttle valve 20 has the function to keep the temperature of the waste gases as constant as possible. Outlet valve 24 allows withdrawing the water contained in trough 18. Baffle plate 23 arranged within cooking chamber 6 causes the air to change its upward direction and to pass along bottom part 22 of cabinet 1 which bottom part 22 is not permeable to air. Furthermore, opening 21 is provided in cabinet 1 to allow part of the air to pass directly into cooking chamber 6 without passing along surface 27 of the heated water in trough 18.

It is, of course, also possible to heat space 6 and the circulating air indirectly by steam or electrically. It has, however, been found that heating with gas or the like flames allows utilization of the heat or the waste gases of the burners and, thus, to render more economical the process of the present invention. The waste gases have in technical operation a mean temperature of 180–200° C. They possess sufficient inherent heat to produce the required temperature for the heat treatment of foods or the scalding of carcasses within the receptacles, molds and the like, or within the heating space.

One wall of the apparatus is designed as door 11 through which receptacles 15 charged with food to be heat treated can be introduced or the treated food can be removed.

In practicing the process according to the present invention the articles of food to be heat treated, for instance, hams, are placed into receptacles 15. Door 11 is then closed and the air space 2 is heated, for instance, to 80° C. and constantly kept at this temperature during the treatment.

It is evident that this process allows continuous rapid recirculation of the same amount of hot air, namely of the air initially present in the apparatus. Thus, only comparatively small amounts of energy are required to heat the air. The moisture content of the circulating air may readily be kept constant because, if the steam thermometer shows the same temperature as the hot air thermometer, the circulating air will be saturated with water vapor. Losses due to leaching of the goods are, therefore, practically completely excluded.

In the process of the present invention, moisture-laden air is used as the heat transfer medium in the cooking of food products. This helps to maintain the high quality and good taste of the cooked food because there is no leaching of water-soluble components in the food, which occurs in the conventional cooking in water or in steam. When rapidly circulating air saturated with water vapor is used to cook the food, the food retains all its water-soluble components, assuring pleasing appearance and taste. Also, the usual loss of weight due to cooking is entirely or almost entirely eliminated, such losses having been calculated as amounting to nearly 50% for beef, about 35% for mutton, almost 30% for veal and about 25% for pork in the conventional cooking processes. In contrast to this, it has been found that, for instance, ham cooked by the present process for five and a half hours had lost no weight, duck cooked for 70 minutes lost only 1.3% of its weight, and chickens lost 0.6% of their weight after 20 minutes of cooking. The cooked meats retained a desirable pink color. Because the rapidly circulating hot moist air which rapidly circulates in a closed circuit is able to penetrate the treated meat quickly but gently, all the meat fibers are swollen without being torn. This makes the meat juicier and easier to digest than meat cooked in water.

The economic advantages of the process are manifold. Because of the afore-mentioned economy in energy due to the re-use of the circulating air, economies up to 75% have been obtained in comparison to water or steam cooking. Also, the cooking time has been cut down by about a third, leading to additional savings in the operation of a cooking plant. Finally, the absence of the accepted weight loss has brought about obvious economic gains in the sale of the cooked-products.

It has been found that the moist air rapidly circulating in a closed circuit will cook meats not only without bursting the meat fibers or cells so that all meat juices are retained in the cooked meat but, in addition, the fat particles will also remain in the meat. Thus, there will be no or little waste fat, which is an advantage not only for the prepared meat but also does away with the cumbersome waste fat pans that have been used in conventional sausage cooking processes.

Since meat is a poor heat conductor, cooking in water requires relatively high temperature to reach the interior of the meat. The exterior portions of the meat will, therefore, shrink and tear when the meat is cooked in water. When cooking with hot moisture-laden air of a temperature of about 78–80° C. the entire piece of meat will remain juicy. Adjustment of the cooking time will depend, of course, on the type of meat, the quantity and individual tastes, as is fully within the skill of the average cook. Merely by way of example, it has been found that, at temperatures of 78° C., a 5-lb. duck was cooked in an hour, a 4-lb. roast beef was done in about 1½ hours, a 10-lb. ham on the bone was cooked in four hours, 2½ lb. of liverwurst was done in about 45 minutes.

It is also possible to modify the process according to the present invention in such a manner that chamber or cabinet 1 is subdivided into several air zones and that goods to be heat treated continuously pass through said air zones which are heated to different temperatures by means of air saturated with water vapors at the respective temperatures and rapidly circulating in a closed circuit.

The new heat treatment by means of hot air rapidly circulating in a closed circuit and saturated with water vapors at the respective temperature can advantageously be applied to the scalding treatment of carcasses in order to soften the skin and to facilitate dehairing, thereby completely eliminating all the disadvantages of the prior art scalding treatment. According to the present invention, the carcass, for instance, of a hog, is placed into the heat treatment apparatus and the circulating air current is adjusted to a temperature of about 60° C. and is saturated with water vapors of the same temperature.

The carcass is then exposed for a suitable period of time to the moist circulating air adjusted to the proper temperature and saturated with water vapor and is continuously kept in motion therein by means of a suitable turning device. Cleaning the carcass by rinsing and washing with water of the same temperature during scalding or before or thereafter is readily possible without causing internal infections.

This process of scalding hogs may, of course, also be used in scalding sheep, goats, and especially in scald and semi-scald picking of poultry. In the scald method of picking, the thoroughly bled bird is plunged into a tank of water of a temperature of about 82° C. The bird is thoroughly soused to permit the water to penetrate through the feathers to the skin, but should be scalded long enough to make the feathers pull easily. After such scalding, the feathers are rubbed off as rapidly as possible. It is common practice to "plump" the carcass, as soon as the plucking is finished, by dipping it first in hot water and then in cold water. This treatment gives the carcass a somewhat rounder, plumper appearance.

In the semi-scald picking, also known as slack-scald method, the bled carcass is plunged into water maintained at a temperature of 51.5–53.5° C. The carcass is agitated in the water from 15 seconds to 1 minute, the length of time depending upon the class of poultry. The feathers are then picked off and the carcass is carefully dried to avoid damage from mold.

Of course, care must be taken in both scalding operations and in plumping that the water is not too hot as to cause discoloration of the skin.

Both methods, scald picking as well as semi-scald picking can advantageously be carried out by the process according to the present invention, whereby the carcass of the animal is first placed into chamber 1 of the apparatus and is kept therein, while rapidly circulating air of the desired temperature and the required moisture content, for a period of time sufficient to permit rapid and easy rubbing off or picking off of the feathers. Plumping may also be effected in such an apparatus.

The new air cooking process is also advantageously used for preparing dishes by stewing or steaming. It may be modified in accordance with the requirements of food preparing establishments such as hotels, restaurants, kitchens for central feeding, for instance, hospitals, soldiers and the like camps etc. The principle of this embodiment of the present invention in all such modified air cooking processes is the same and comprises the use of gas burners, the waste gases of which are passed through the heat treatment space in a heat exchanging arrangement, rapid circulation of the air contents of the heating space of the device in a closed circuit, and, at the same time, provision of a water evaporation container adapted to produce and to maintain the required water vapor pressure corresponding to saturation at the temperature within the device.

I claim:
1. An apparatus for heat treating meat products comprising, in combination,
   (1) an upright heat-insulated fluid-impermeable outer casing,
   (2) a cabinet adapted to receive the food and mounted in spaced relation to the outer casing,
   (3) the casing and the cabinet defining an air chamber therebetween which surrounds the cabinet,
   (4) a fluid permeable bottom wall for said cabinet,
   (5) a sump filled with water at the bottom of the casing below the bottom wall of the cabinet,
   (6) an air circulating fan of high circulating capacity arranged in said casing on top of said cabinet and within said air chamber,
   (7) said fan forcing the air in a closed circuit downwardly through said chamber, into contact with the water in the sump, then upwardly through said fluid permeable bottom wall into said cabinet and back into the chamber,
   (8) means for heating the air in said air chamber to heat treating temperature,
   (9) means for heating the water in the sump to produce water vapor, and
   (10) means for independently controlling the heating of the air and of the water.

2. The apparatus of claim 1, wherein the heating means for the air is mounted in the air chamber.

3. The apparatus of claim 2, wherein said heating means for the water in the sump is a gas burner, a flue pipe means for the waste gases from the gas burner leading through the air chamber and constituting the heating means for the air.

4. A roasting oven using a mixture of air and steam as the heat transfer medium, comprising
 a heat insulated, substantially air-tight housing,
 a cabinet defining therein a chamber for receiving the material to be roasted,
 means mounting said cabinet in said housing in spaced apart relation to at least one wall thereof to define an air space between said wall and said cabinet,
 means mounted in said air space for controllably heating the air in said air space to a predetermined temperature,
 blower means for recirculating air between said air space and said chamber,
 means for holding a supply of water below said cabinet in a position wherein said recirculating air passes directly across the surface of said water to entrain moisture therein, and
 heating means for controlling the temperature of the water in said last-named means.

5. A roasting oven as set forth in claim 4 wherein said means for heating the air and said heating means for controlling the temperature of the water are mutually independent whereby the temperature of the air steam mixture and the degree of saturation thereof are separately adjustable.

6. An oven comprising
 a heat insulating housing having an access door therein,
 a cabinet defining an oven mounted in said housing in spaced relation to at least the top wall and one side wall of said housing to define interconnected air spaces,
 a blower mounted in the space between the top walls of said cabinet and said housing adjacent an opening in said top wall of said cabinet for circulating air from said chamber through said air spaces,
 a container mounted below said chamber for holding a supply of water and disposed so that the air blown through said spaces passes across the surface of said water and re-enters said chamber at the bottom,
 means mounted in one of said air spaces for heating the air passing therethrough, and
 means for heating said water in said container,
 whereby a heating medium comprising a mixture of air and steam is recirculated through said oven chamber.

References Cited by the Examiner

UNITED STATES PATENTS

| | | | |
|---|---|---|---|
| 1,272,046 | 7/1918 | Iamonaco | 126—20.1 |
| 1,825,790 | 10/1931 | Hansen | 263—2 |
| 2,060,434 | 11/1936 | Vincent | 126—20 |
| 2,380,121 | 7/1945 | Robertson | 126—20 |
| 2,423,964 | 7/1947 | Coffman | 99—107 |
| 2,524,272 | 10/1950 | Sage. | |
| 2,532,009 | 11/1950 | Clay | 99—107 |
| 2,663,049 | 12/1953 | Van Dolah | 17—45 |
| 2,667,661 | 2/1954 | Long | 17—45 |

FOREIGN PATENTS

| | | |
|---|---|---|
| 23,121 | 10/1906 | Great Britain. |
| 332,874 | 7/1930 | Great Britain. |

FREDERICK L. MATTESON, JR., *Primary Examiner.*

JAMES W. WESTHAVER, *Examiner.*

V. M. PERUZZI, E. G. FAVORS, *Assistant Examiners.*